United States Patent [19]

Davis

[11] 4,004,202

[45] Jan. 18, 1977

[54] BRUSHLESS D.C. MOTOR

[75] Inventor: Sidney A. Davis, East Norwich, N.Y.

[73] Assignee: IMC Magnetics Corporation, Westbury, N.Y.

[22] Filed: Jan. 29, 1975

[21] Appl. No.: 545,051

[52] U.S. Cl. .............................. 318/138; 318/254
[51] Int. Cl.$^2$ ........................................ H02K 29/00
[58] Field of Search .......................... 318/138, 254

[56] References Cited
UNITED STATES PATENTS

| | | | |
|---|---|---|---|
| 3,091,728 | 5/1963 | Hogan et al. ................... | 318/254 X |
| 3,189,808 | 6/1965 | Henry-Baudot .................... | 318/138 |
| 3,402,333 | 9/1968 | Hayner et al. ...................... | 318/138 |
| 3,585,474 | 6/1971 | Kobayashi et al. ............. | 318/254 X |
| 3,903,463 | 9/1975 | Kanamori ...................... | 318/254 X |
| 3,909,690 | 9/1975 | Sugiura .......................... | 318/254 X |

Primary Examiner—Gene Z. Rubinson
Attorney, Agent, or Firm—Alan H. Levine

[57] ABSTRACT

A motor comprising a permanent magnet rotor, a plurality of stationary stator windings around the rotor, and an electromagnetic commutator for sequentially energizing and deenergizing the windings. The commutator includes a stationary transformer including a primary winding and a plurality of secondary windings equal in number to the number of stationary stator windings. The primary and secondary windings may be in the form of conductive patterns on printed circuit boards. An oscillator supplies a high frequency A.C. signal to the transformer primary. An apertured shield located between the primary and secondary windings rotates with the rotor and causes the secondary windings to be energized in sequence. Switch means, which may be transistors associated with the stationary stator windings are closed and opened in sequence, in response to energization and deenergization of the transformer secondary windings, in order to energize and deenergize the stationary windings in sequence. The position of the transformer secondary windings may be adjusted, or an auxiliary set of secondary windings may be used, to reverse the direction of rotation of the rotor.

11 Claims, 8 Drawing Figures

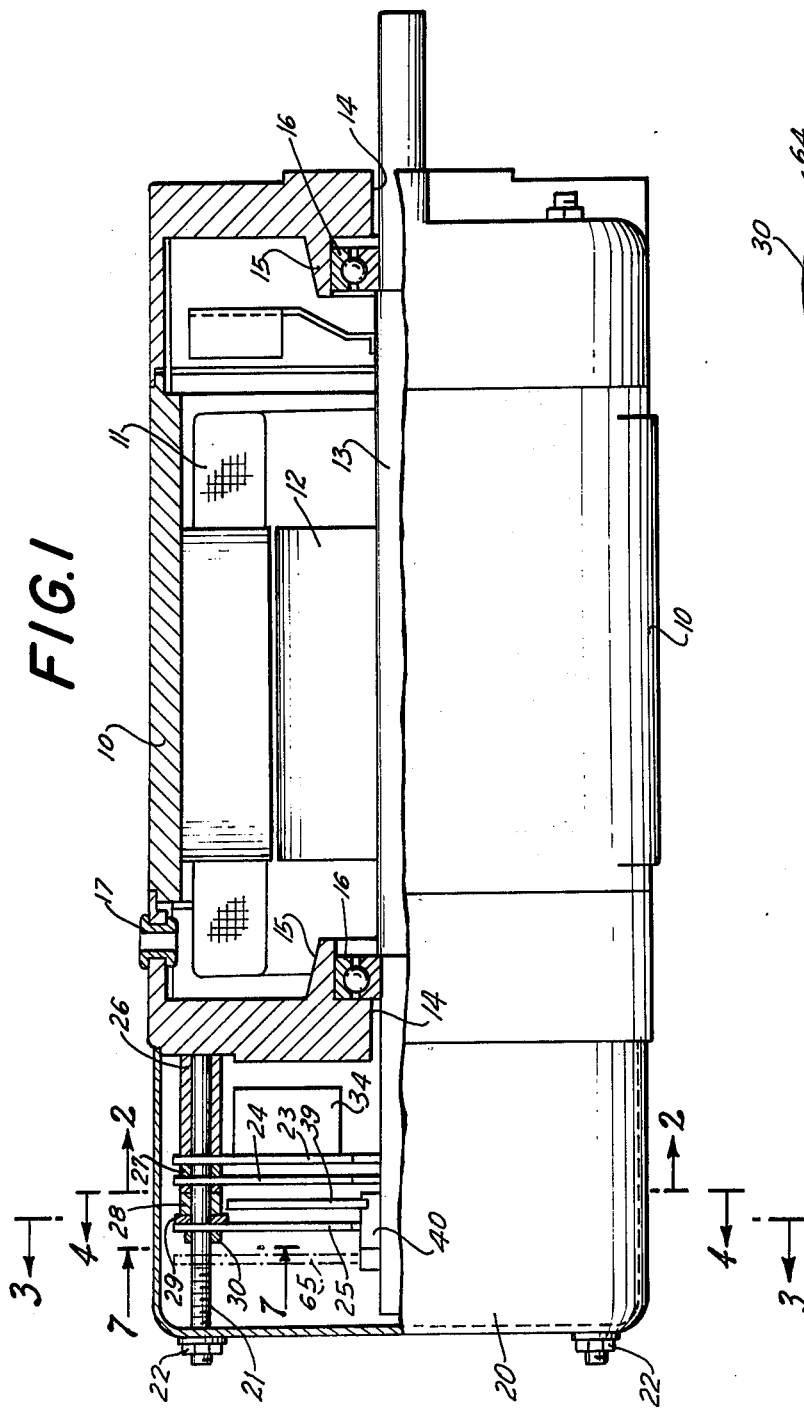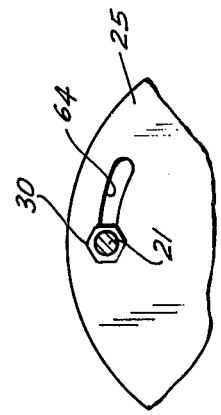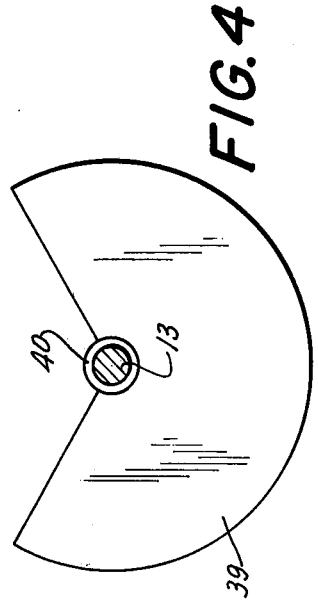

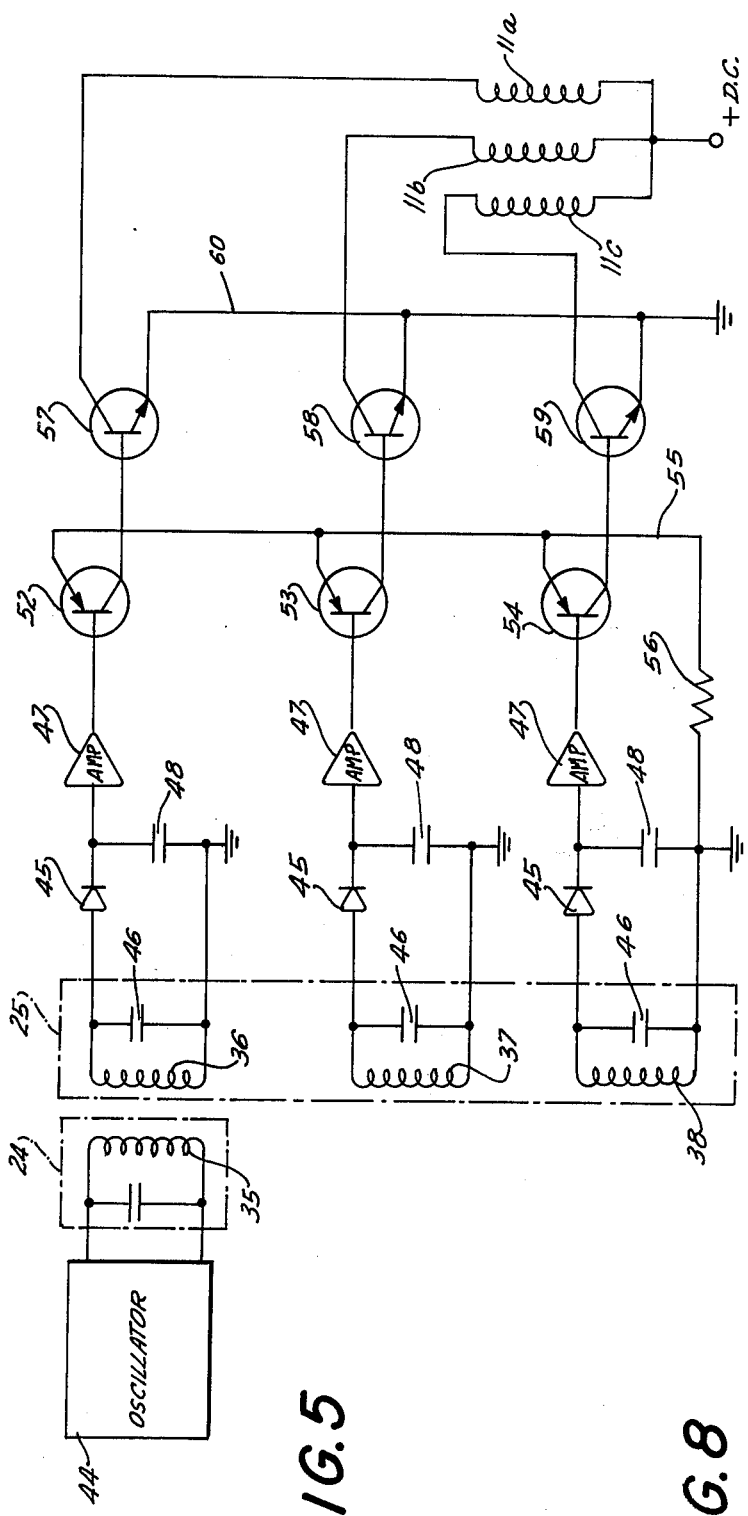
FIG.5
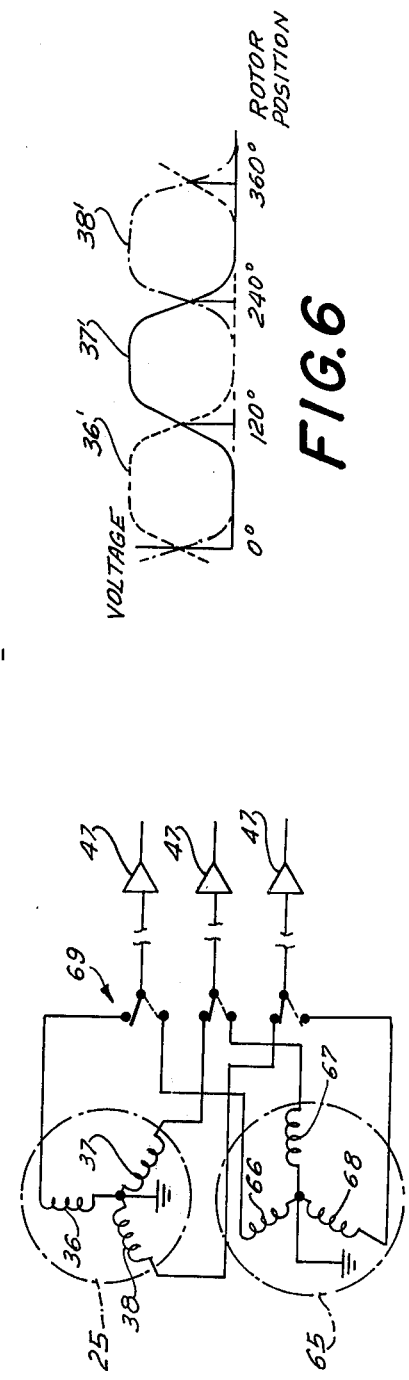
FIG.6
FIG.8

BRUSHLESS D.C. MOTOR

This invention relates to D.C. motors to the type having a permanent magnet rotor, and more particularly to brushless motors of this type.

Conventional D.C. motors employ commutators and brushes for accomplishing the switching required to energize and deenergize the motor coils. However, mechanical commutators pose problems in applications requiring high reliability and long life. The sliding contact between brushes and commutator causes wear on the parts. Furthermore, when such a motor is used in certain types of environments, such as highly corrosive atmospheres, the electrical contact between brush and commutator may be interfered with due to contamination of the parts. There are other well known deficiencies of commutator-brush devices.

In order to avoid these deficiencies, brushless D.C. motors have been suggested in the past. These motors eliminate the mechanical switching provided by a commutator and brushes. An example of brushless D.C. motors is a motor employing a plurality of light sources and associated light sensors. A light-interrupting means rotates with the motor shaft to sequentially block and transmit light from the light source to the light sensors, and thereby effect switching as a function of motor shaft position.

Another example of brushless D.C. motors is one employing Hall effect resistors fixed to the stator and arranged in the field of the permanent magnet rotor. As the rotor rotates, each resistor develops an output voltage which is a function of the rotor position, and these voltages are used to effect switching of the stator coils.

An important problem presented by brushless D.C. motors used in the past involves their sensitivity to temperature variations. The outputs of light emitting diodes and of Hall effect resistors vary considerably with temperature. Hence, where extremes of temperature are encountered by the motor, operation becomes unreliable. Furthermore, atmospheric contaminants can interfere with performance of motors using light sources for switching. In addition, in this type of motor if a lamp is used in place of a light emitting diode, lamp life becomes a possible problem.

It is an object of the present invention to overcome these problems by providing a brushless D.C. motor employing a commutator which is not subject to wear and is completely insensitive to temperature variations.

It is a more specific object of the invention to provide a brushless D.C. motor incorporating an electromagnetic commutator wherein switching is accomplished by coupling and decoupling the primary and secondary windings of a transformer.

It is a further object of the invention to provide such a brushless D.C. motor wherein a high radio frequency signal is employed as the energy coupling the primary and secondary windings of the transformer.

It is another object of the present invention to provide a brushless D.C. motor in which all electronic components can, if desired, be separated from the motor and commutator so that these components are not subjected to the immediate environment surrounding the motor and commutator.

An additional object of the invention is to provide a brushless D.C. motor having high unit-to-unit uniformity without the need for trimming during manufacturing. Trimming is often required when optical and Hall effect commutators are used due to the wide manufacturing tolerances of semiconductor devices.

It is a further object of the invention to provide a brushless D.C. motor employing a commutator which is both highly reliable and can readily be manufactured economically on a mass production basis.

Additional objects and features of the invention will be apparent from the following description, in which reference is made to the accompanying drawings.

In the drawings:

FIG. 1 is a partial longitudinal cross-sectional view of a brushless D.C. motor according to the present invention, the lower portion of the motor being shown in elevation;

FIG. 4 is a cross-sectional view taken along line 4—4 of FIG. 1, showing the face of a shield rotatable with the rotor;

FIG. 5 is a schematic view of the electromagnetic commutator circuitry;

FIG. 6 is a diagram illustrating the variations in voltage in the three secondary windings of the transformer;

FIG. 7 is a cross-sectional view taken along line 7—7 of FIG. 1; and

FIG. 8 is a schematic diagram illustrating an alternative arrangement of transformer secondary windings to permit reversing the direction of rotation of the motor.

Figure 2:
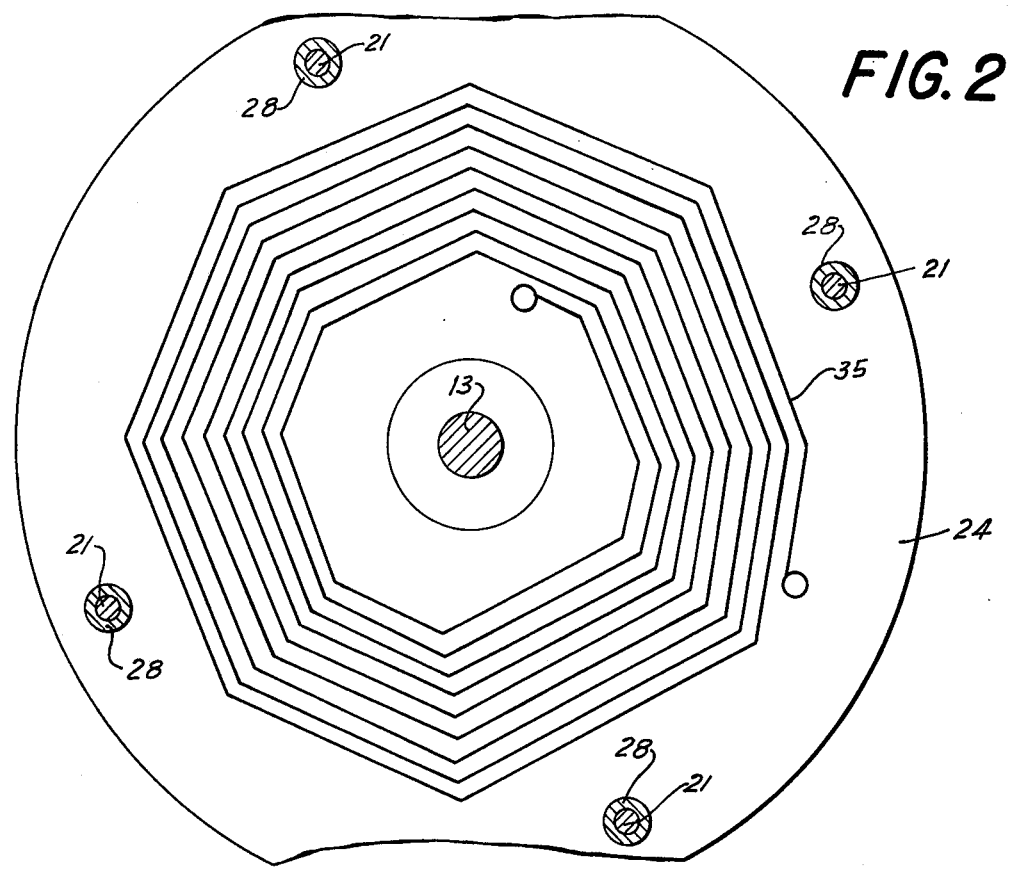
FIG. 2 is a cross-sectional view taken along line 2—2 of FIG. 1 showing the face of a printed circuit board carrying the transformer primary winding.

The brushless D.C. motor chosen to illustrate the present invention, and shown in FIG. 1, includes a housing 10 within which are a plurality of stationary stator windings 11, only one being visible in FIG. 1. In the present illustration, three stator windings are employed, these being identified by reference numerals 11a, 11b, and 11c in FIG. 5. However, it is understood that two or more stationary stator windings can be used, and preferably at least three are employed. Within the stator windings 11 is a cylindrical permanent magnet rotor 12 fixed to a motor shaft 13 which extends beyond both ends of the rotor 12.

Shaft 13 extends freely through openings 14 in the opposite ends of housing 10. Hollow bosses 15 surround openings 14 and project into the housing from the inner surfaces of the housing ends. Ball bearings 16 are fixed within bosses 15 and rotatably support shaft 13 with respect to the housing. Electrical conductors (not shown) for supplying electric current to the motor pass through a hole in housing 10 lined by a grommet 17.

Secured to one end of housing 10 is a cup-shaped cap 20. Four long threaded studs 21 extend from that end of the housing and through four holes in the cap 20. A nut 22 threaded on each stud 21 holds cap 20 against housing 10.

Supported on studs 21, within cap 20, are a support plate 23, and two printed circuit boards 24 and 25. Each of the support plate 23 and printed circuit boards 24 and 25 is provided with an enlarged central opening through which shaft 13 passes freely, and with four holes through which studs 21 pass. A tubular spacer 26 surrounds each stud 21 between the end of housing 10 and support plate 23, a spacer ring 27 surrounds each stud 21 between support plate 23 and printed circuit board 24, a spacer 28 and washer 29 surround each stud 21 between the two printed circuit boards 24 and 25, and a nut 30, threaded on to each stud 21, is tightened against the outer face of printed circuit board 25.

Support plate 23 carries an electronic package 34 comprising the components illustrated schematically in FIG. 5. Where necessary or desirable, support plate 23 could be eliminated, and electronic package 34 arranged at a location remote from the motor, the electronics being connected to the motor by suitable conductors. This may be desirable when the motor is used in an environment, such as a high temperature environment, which would adversely affect the semiconductor or other electronic components.

Figure 3:
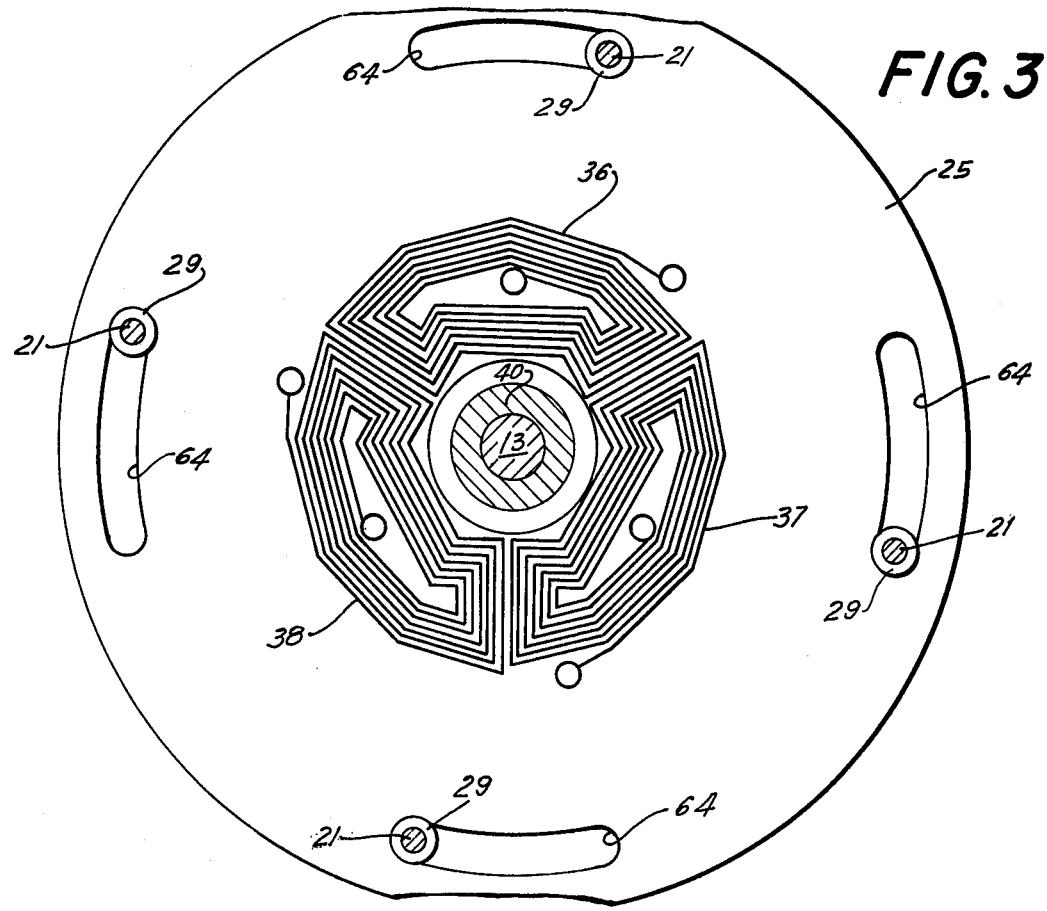
FIG. 3 is a cross-sectional view taken along line 3—3 of FIG. 1, showing the face of a printed circuit board carrying a plurality of secondary windings.

Printed circuit boards 24 and 25 constitute a transformer. As may be seen most clearly in FIG. 2, board 24 carries a printed circuit primary winding 35. As shown in FIG. 3, board 25 carries three printed circuit secondary windings 36, 37, and 38. Three secondary windings are employed because the stator of the motor includes three stationary windings 11a, 11b, and 11c. The number of secondary windings carried by board 25 equals the number of stator windings of the motor since, as will be apparent from the description which follows, one secondary winding of the transformer is allocated to each winding of the stator.

Arranged between printed circuit boards 24 and 25 is an electrically-conductive plate-like shield 39. Shield 39 is of a smaller diameter than boards 24 and 25, so that it fits within the space defined by the four studs 21 without interfering with the studs. Further more, shield 39 is fixed to, and rotatable with, shaft 13 by means of a collar 40. As shown most clearly in FIG. 4, shield 39 has a generally circular shape, but with a sector removed. The size of the removed sector is such that at any one time shield 39 can cover all but one of the secondary windings 36-38. In the present example, since there are three secondary windings, the removed sector of shield 39 subtends an angle of 120°. If board 25 were carrying four secondary windings, the removed section of shield 39 would subtend an angle of 90°.

Shield 39 is formed of a material capable of interrupting the transfer of energy between primary winding 35 and secondary windings 36-38. In the present example, a radio frequency signal is applied to primary winding 35. Therefore, shield 39 is formed of a material, such as aluminum, capable of blocking transmission of the radio frequency signal from primary winding 35 to secondary windings 36-38. However, it will be obvious that in the region of the removed section of shield 39, transfer of energy between primary winding 35 and secondary windings 36-38 is permitted.

The electromagnetic commutator of the present invention will now be further described with reference to FIG. 5. All of the components illustrated in FIG. 5, except for the transformer coils and the stator coils, may be included in the electronic package 34. An oscillator 44, of any conventional suitable type, is arranged to provide a radio frequency signal to primary coil 35. The frequency of the signal is preferably in the Mega-Hertz range, a typical frequency being 2.5 MHz. Higher frequencies may be used, and in fact one of the advantages of the present invention accrues from the use of a high frequency, since as a result of the high frequency used to couple the transformer primary and secondary windings, the commutator is capable of extremely fast switching. Furthermore, it is easier to shield higher frequencies than lower frequencies, and smaller components can be used to filter higher frequencies.

One end of each of the secondary coils 36-38 is connected to ground, and the other end is connected to a diode 45. If desired, a capacitor 46 may be shunted across each secondary coil to tune the coil so as to produce a somewhat higher signal level. The other side of each diode is connected to the input of an amplifier 47. If desired, a capacitor 48 may be connected between the input of the amplifier and ground to filter the D.C. signal leaving diode 45.

The outputs of amplifiers 47 are connected to the bases of transistors 54, 53, and 54, respectively. The emitters of all three transistors are connected together by conductor 55, and through common emitter resistor 56 to ground. The collectors of transistors 52-54 are connected to the bases of transistors 57, 58, and 59, respectively. The emitters of transistors 57-59 are connected to ground by a common conductor 60, and the collector of each of these transistors is connected to one end of one of the stator coils 11a-c, respectively. The opposite ends of coils 11a-c are connected together to a source of D.C. power.

As shield 39 rotates with motor shaft 13, a high frequency voltage is induced in each of the secondary coils 36, 37, and 38, in sequence. The voltages induced in the secondary coils are illustrated in FIG. 6. At the start of one complete revolution of shield 39, the voltage 36′ in coil 36 is rising. The voltage reaches a maximum value and then begins to fall. After shield 39 has rotated through 120°, the voltage 37′ in coil 37, which has been rising, crosses and exceeds voltage 36′ which shortly thereafter drops to zero when coil 36 is completely shielded from primary coil 35. After 240° of rotation of shield 39, voltage 38′ in coil 38 crosses and exceeds the falling voltage 37′, and at the completion of the revolution, voltage 36′ crosses and exceeds voltage 38′, to begin the cycle again.

The signal induced in each of the coils 36-38 is rectified by diode 45, and the resulting D.C. signal is applied to amplifier 47. The outputs from the amplifiers are applied to the bases of transistors 52-54, respectively. Resistor 56 serves to back-bias the two transistors which at any instant receive the lower driving voltages. In other words, only the transistor connected to the amplifier 47 which is providing the highest output voltage is turned on, while the other two transistors are turned off. It will be appreciated from an inspection of FIG. 6 that, as a result, transistors 52, 53, and 54 are turned on and then off in sequence. More specifically, as shield 39 passes the 120° point in its rotation, transistor 53 turns on, transistor 52 turns off, and transistor 53 remains off. As shield 39 passes the 240° point, transistor 54 turns on and transistors 52 and 53 are off. When shield 39 passes the 360° point, transistor 52 turns on and transistors 53 and 54 are off.

In response to transistors 52, 53, and 54 being turned on and off in sequence, transistors 57, 58, and 59 are also turned on and then off in sequence. When transistor 57 is turned on, a circuit is completed from the D.C. source through coil 11a transistor 57, and conductor 60 to ground, thereby completing a circuit for energizing the coil 11a. In similar fashion, the turning on of transistors 58 and 59 causes energization of coils 11b and 11c, respectively. It will be seen, therefore, that coils 11a-c are energized in sequence. As is usual in such motors, energization of the stator coils in sequence causes rotation of the permanent magnet rotor 12.

It will be appreciated that proper functioning of the motor depends upon an appropriate relative angular positioning between the stator coils 11 and the secondary coils 36–38. If coils 36–38 "lead" the stator coils, rotor 12 will rotate in one direction, and if the secondary coils "lag" the stator coils, the rotor will rotate in the opposite direction. Consequently, it is a relatively simple matter to provide for reversability of the motor according to the present invention.

As indicated in FIGS. 3 and 7, the holes in printed circuit board 25, through which studs 21 pass, are actually elongated arcuate slots 64. When rotation in one direction is desired, board 25 is adjusted so that each stud 21 is located at one end of its respective slot 64, and nut 30 is tightened to retain this position of adjustment. Should it be desired to reverse the direction of rotation of rotor 12, nuts 30 are loosened, board 25 is rotated so that each stud 21 is arranged at the opposite end of its respective slot 64, and nuts 30 are retightened.

An alternative way of providing for reversability of the present motor involves providing an auxiliary printed circuit board 65 identical to board 25, as indicated in FIGS. 1 and 8. In this alternative arrangement, the holes in boards 25 and 65 need not be slots, as indicated at 64 in FIG. 3, since no adjustment of either board is necessary. However, board 65 is arranged so that the secondary coils 66, 67, and 68 which it carries are angularly offset from the coils carried by board 25. Arranged between the coils of each circuit board and the remainder of the commutator circuit is a three pole, double throw switch 69. In FIG. 8, the three movable contacts of switch 69 are shown in solid lines connecting the coils of printed circuit board 25 to the remainder of the commutator circuit, and the coils of printed circuit board 65 are unconnected to the circuit. When it is desired to reverse the direction of rotation of rotor 12, switch 69 is shifted so that its movable contacts are in their dotted line positions wherein they connect the coils of printed circuit board 65 to the remainder of the circuit and simultaneously disconnect the coils of printed circuit board 25 from the circuit.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A brushless D.C. motor comprising a magnetic rotor, a plurality of stationary windings around said rotor, and commutator means for sequentially energizing and deenergizing said windings, said commutator means including:
   a. a stationary transformer having a primary winding and a plurality of secondary windings, the number of secondary windings being equal to the number of stationary windings, said primary winding being in the form of a printed circuit board, and said secondary windings being in the form of a single printed circuit board spaced from said primary winding board,
   b. an oscillator for supplying an A.C. signal to said primary winding,
   c. an apertured shield between said primary winding circuit board and said secondary windings circuit board, said shield being rotatable with said rotor for passing said A.C. signal to and blocking said A.C. signal from each of said secondary windings in sequence to energize and deenergize the latter in sequence,
   d. switch means associated with each of said stationary windings, and
   e. means responsive to the energization and deenergization of said secondary windings for closing and opening said switch means in sequence so as to energize and deenergize said stationary windings in sequence.

2. A brushless D.C. motor as defined in claim 1 wherein said oscillator provides a radio frequency signal, and said shield is formed of a material impenetrable by radio frequency signals.

3. A brushless D.C. motor as defined in claim 1 wherein said shield is a circular disk formed of an electrically conductive metal, said disk having a sector removed from it.

4. A brushless D.C. motor as defined in claim 1 wherein said responsive means includes means for transmitting a signal from each of said secondary windings to one of said switch means proportional to the voltage induced in said secondary winding, and means for closing the switch means receiving the highest signal and opening the other switch means.

5. A brushless D.C. motor as defined in claim 4 wherein each of said switch means includes a transistor, and said means for closing and opening said switch means includes a common emitter circuit for all said transistors.

6. A brushless D.C. motor as defined in claim 4 wherein said transmitting means includes a rectifier and amplifier circuit between each of said secondary windings and one of said switch means.

7. A brushless D.C. motor as defined in claim 1 including means for adjusting the position of said secondary windings with respect to said primary windings for reversing the direction of rotation of said rotor.

8. A brushless D.C. motor comprising a magnetic rotor, a plurality of stationary windings around said rotor, and commutator means for sequentially energizing and deenergizing said windings, said commutator means including:
   a. a stationary transformer having a primary winding and a plurality of secondary windings, the number of secondary windings being equal to the number of stationary windings, said primary winding being in the form of a printed circuit board, and said secondary windings being in the form of a single printed circuit board spaced from said primary winding board,
   b. an oscillator for supplying an A.C. signal to said primary winding,
   c. an apertured shield between said primary winding circuit board and said secondary windings circuit board, said shield being rotatable with said rotor for passing said A.C. signal to and blocking said A.C. signal from each of said secondary windings in sequence to energize and deenergize the latter in sequence,
   d. switch means associated with each of said stationary windings, and
   e. means responsive to the energization and deenergization of said secondary windings for closing and opening said switch means in sequence so as to energize and deenergize said stationary windings in sequence, f. said printed circuit boards being spaced apart along the axis of said rotor, each of said boards having a hole through which said rotor extends in freely rotatable fashion, and said shield being mounted on and rotatable with said rotor.

9. A brushless D.C. motor comprising a magnetic rotor, a plurality of stationary windings around said rotor, and commutator means for sequentially energizing and deenergizing said windings, said commutator means including:
 a. a stationary transformer having a primary winding and a plurality of secondary windings, the number of secondary windings being equal to the number of stationary windings,
 b. an oscillator for supplying an A.C. signal to said primary winding,
 c. an apertured shield between said primary winding and said secondary windings, said shield being rotatable with said rotor for passing said A.C. signal to and blocking said A.C. signal from each of said secondary windings in sequence to energize and deenergize the latter in sequence,
 d. switch means associated with each of said stationary windings,
 e. means responsive to the energization and deenergization of said secondary windings for closing and opening said switch means in sequence so as to energize and deenergize said stationary windings in sequence, and
 f. said transformer including a second set of secondary windings similar to the first-described secondary windings, said second set being angularly offset with respect to said first-described windings, and switch means for alternatively connecting either said first-described windings or said second set to said responsive means for selecting the direction of rotation of said rotor.

10. A brushless D.C. motor as defined in claim 1 wherein said primary winding circuit board carries only a single primary winding.

11. A brushless D.C. motor as defined in claim 1 wherein said two printed circuit boards and said shield are all axially aligned and arranged in parallel planes.

* * * * *